Jan. 10, 1950 J. P. MURPHY ET AL 2,493,992
ELECTROMAGNETIC FISHING TOOL
Filed Nov. 1, 1948 2 Sheets-Sheet 2

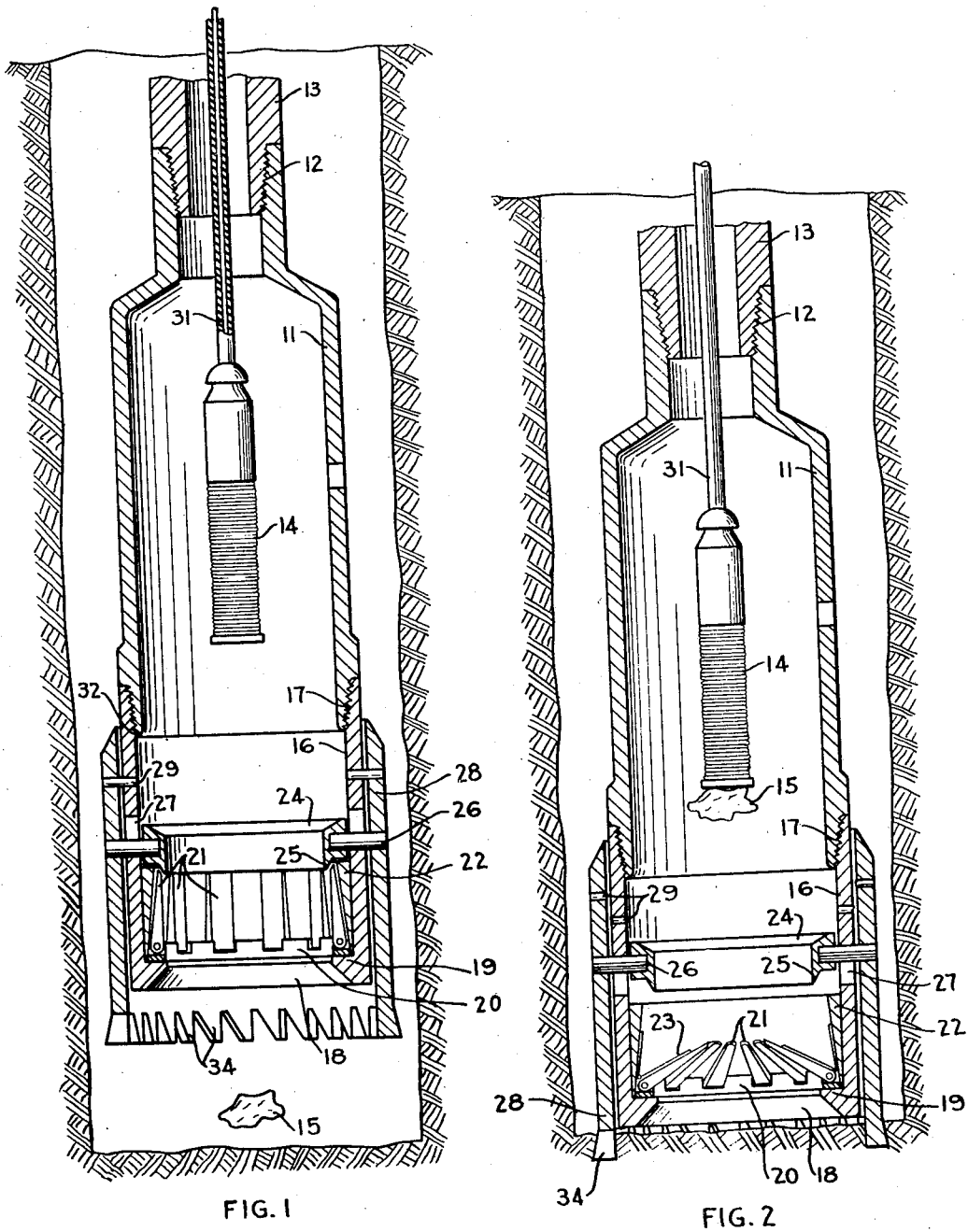

INVENTORS: J.P. MURPHY
H.E. McKINNEY
BY THEIR ATTORNEY

Patented Jan. 10, 1950

2,493,992

UNITED STATES PATENT OFFICE 2,493,992

ELECTROMAGNETIC FISHING TOOL

James P. Murphy and Howard E. McKinney, Houston, Tex., assignors to Shell Development Company, San Francisco, Calif., a corporation of Delaware Application November 1, 1948, Serial No. 57,754

6 Claims. (Cl. 294—86.1)

This invention relates to a method and apparatus for recovering objects from well boreholes and pertains more particularly to a method and apparatus for removing undesirable pieces of magnetizable material such as tools, broken drill bit cutters, rollers, bearings, etc., from wells wherein said pieces of material may be covered with water, oil, drilling fluid, sand, drill cuttings or the like.

In well drilling operations, various objects such as lugs, slips, bolts, parts of drill bit, etc., are sometimes lost down the well borehole. Any of these various objects may interfere with the drilling operations, for example, by injuring the rotary drill bit, etc. It is, therefore, essential that such objects be removed before continuing drilling operations.

Objects lost in a well borehole are usually removed by means of a fishing tool. If the objects are made of magnetizable material, they may be removed by means of a magnetic or electromagnetic fishing tools which are well known to the art, although they possess certain undesirable characteristics. Since the magnetizable object to be removed from the bottom of the well may be covered with sand, drill cuttings, etc., which have settled to the bottom, it is generally impractical to use an ordinary magnetic fishing tool as the layer of sand effectively insulates the object thus preventing the fishing tool from picking it up. Many well boreholes deviate from the vertical, with the result that when any fishing tool is lowered into the borehole at the end of a cable, it slides along the wall of said borehole. Thus, in withdrawing a magnetic fishing tool and a magnetized object carried thereby from a well borehole, the friction contact between the magnetized object and the borehole wall may be enough to knock the object off the end of the fishing tool. Also, most magnetic fishing tools cannot be used in a well having any of its length cased in tubular sections of a magnetizable material, which is the general practice in well drilling operations. Even though the sides of the magnetic fishing tool, which could contact the steel casing, may be sheathed in an insulating material, the object or "fish," on being picked up by the tool, becomes magnetized and if it is large enough, or so positioned on the pick-up face of the fishing tool that a portion of it extends beyond the sides of the tool, it will tend to attach itself to the metallic well casing and thus hinder the withdrawal of the tool from the well.

It is, therefore an object of the present invention to provide a method and apparatus for removing a magnetizable object from the bottom of a well borehole where it may be covered with several inches of sand or drill cuttings.

It is also an object of the present invention to provide a method and apparatus for removing magnetizable objects from a well borehole that are too large to be carried up a drill string.

A further object of the present invention is to provide a method and apparatus for safely and readily removing magnetizable objects from a slanting borehole.

Still another object of this invention is to provide a method and means for electrically determining whether the object sought has been contacted and picked up by the fishing tool.

These and other objects of this invention will be understood from the following description taken with reference to the attached drawing, wherein:

Figure 1 is a longitudinal view, partly in cross section, of the device of the present invention.

Figure 2 is another view of the apparatus of Figure 1 after the tool has picked up a magnetizable object from the bottom of the well and withdrawn it into the cage and trap means provided therefor.

Figure 3:
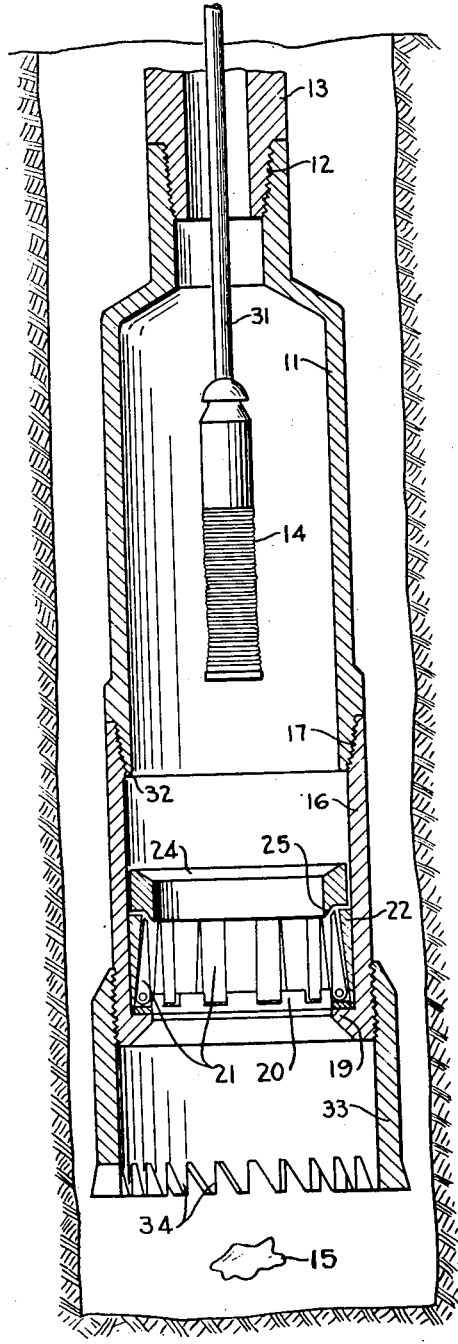
Figure 3 is a longitudinal view, partly in cross section, of another embodiment of the fishing tool and cage means of the present invention.

Referring to Figure 1 of the drawing, a preferably tubular housing or cage 11 is shown secured to the lower end of a string of drill pipe 13 by screw threaded engagement at 12. The cage 11 is of a size to pass easily through the borehole, having an outside diameter smaller than the inside diameter of the borehole. Preferably, however, the inside diameter of the cage 11 is larger than the inside diameter of the pipe string 13 to which it is attached so that the cage is adapted to contain objects, to be removed from the well, that are too large to pass through the tubing 13. The length of the cage 11 is preferably sufficient to accommodate an electromagnet 14 and any magnetizable object 15 picked up thereby. The housing or cage 11 is constructed of a non-magnetic material such as stainless steel, plastic, etc., or of any magnetic substance that is sheathed or coated with any suitable insulating material. However, only the inside of the cage 11 need be insulated.

Affixed to the lower open end of the cage 11 is a trap means which may comprise a preferably tubular trap housing 16 secured thereto in any suitable manner as by screw threads at 17, said trap housing having an open lower end 18 adapted to be substantially closed by suitable closure means. In this embodiment a flange 19 is secured to or integrally formed on the inner surface of the housing 16, said flange forming suitable seating means for a notched holding ring member 20 having a plurality of finger-like closure elements 21 pivotally secured thereto, said elements being preferably in the form of a sector. The finger-like elements 21 are mounted so as to be movable from a substantially vertical nonoperative position (Figure 1) to a substantially horizontal position, the fingers 21 in Figure 2 being shown as they approach their horizontal position. If desired a wedge-shaped annular sleeve 22 may be positioned in back of the closure elements 21, whereby said elements 21 are tipped inwardly so that they automatically fall into their closed operative position when they are unlatched. Springs 23 (Figure 2) or other actuating means may be positioned in back of the closure elements 21 for actuating said elements 21.

The finger-like closure means 21 are held in an inoperative vertical position, as shown in Figure 1, by any suitable latching means which may comprise, for example, a ring-shaped element 24 having a downwardly extending lip 25 formed on the lower side thereof, said lip being adapted to engage the tips of the closure means 21. In order to disengage the latching ring 24 from the closure fingers, the ring, slidably positioned within the trap housing 16, is fixedly secured by means of a plurality of pins 26 which pass through a plurality of longitudinal slots 27 in the wall of said housing 16 and are suitably affixed, as by welding, to a tubular element or wash-over shoe 28 which is slidably mounted on the outside of the trap housing 16. The shoe 28 and latching ring 24 are normally fixedly positioned by means of shear pins 29. The bottom edge of the shoe 28 is generally formed into a plurality of cutting teeth 34 which may help in the removal of sand or other material from around the object 15 which is to be removed from the well. Preferably, the diameter of the shoe 28 is substantially as large as the well borehole so that the object 15 to be removed lies within the axial bore of said shoe.

As shown in the drawing, any suitable electromagnet 14, of a size to be passed through the drill pipe 12 may be used in conjunction with the above-described cage and trap means to remove magnetizable objects from the well borehole. The electromagnet is connected to a suitable power source at the surface by suitable cable means 31 by which it is lowered into and removed from the tubing string 12. Since electromagnets of this type are well known to the art they will not be further described.

Another embodiment of the present invention is shown in Figure 3 having latching means, similar to that shown in Figure 1, which are adapted to be operated or unlatched by the electromagnet 14. In this embodiment the latching ring 24 is made of a magnetic material and is mounted within the non-magnetic trap housing 16 for sliding movement between the shoulder 32 formed by the lower end of the cage 11 and the shoulder formed at the top of the wedge-shaped sleeve 22. The latching ring 24 may rest on the top of sleeve 22 while holding the finger-like closure means 21 in the inoperative position. The latching ring 24 disengages the tips of the closure means 21 when the electromagnet 14 is raised into the cage with whatever object it has picked up. The latching ring, being the only part of the cage or trap made of magnetic material becomes attached to the electromagnet and is raised therewith until further upward movement is limited by the shoulder 32, or until the current to the electromagnet 14 is turned off. At this time the ring 24 will return to its normal seating position on the sleeve 22. If desired, a wash-over shoe 33 may be threadedly secured to the lower end of the trap housing 16.

In removing a magnetizable object from the bottom of a well borehole, the apparatus is assembled, as shown in Figures 1 or 3, with the cage, trap means and wash-over shoe secured together and to the lower end of the drill string 13. At this time the trap means is in its operative position with its latching mechanism retaining the closure means in an open position as shown in Figures 1 and 3. Sufficient sections of drill pipe are coupled together until the wash-over shoe 28 (Figure 1) touches the bottom of the well, but with most of the weight of the drill string still being suspended from a well derrick above the borehole. Since the object to be picked up by the electromagnet may be covered by sand, suitable pump means (not shown) are connected to the upper end of the drill string whereby a fluid such as drilling mud, water, or the like may be pumped down the drill string to the bottom of the well to circulate under and around the wash-over shoe so as to flush away any covering sand and expose the magnetizable object 15 at the bottom of the well. At the same time, if desired, the drill string may be rotated by suitable means located at the surface (e. g. a rotary table, not shown), in a manner well known to the art. On rotation of the drill string 13, the attached wash-over shoe cuts away any material from around the object 15 while the circulating fluid washes the material away.

After the rotation of the drill string has been discontinued and fluid circulation stopped, the Kelly is disconnected from the drill string 13, and electromagnet 14 secured to a cable 31 is lowered into the drill string 13, cage 11 and trap means to the bottom of the well. Power from the power source is turned on energizing the electromagnet 14 and causing the object 15 to be magnetized and attracted thereto. The electromagnet 14 and the object carried thereby are raised into the cage 11 by reeling in a short length of the cable 31. With the object 15 suspended in the cage 11 the drill string 13 is lowered thus allowing a sufficient weight of the drill string to rest on the bottom of the borehole whereby the pins 29, which position the wash-over shoe 28, are sheared off. After the pins 29 are sheared, the drill string 13 drops a short distance which is limited by the pins 26 contacting the top of the longitudinal slots 27. Thus, the finger-like closure means 21 are lowered, or the latching ring 24 is raised, whereby said closure means are forced by springs 23, or allowed to fall in a substantially horizontal position as shown in Figure 2. Any number, size or shape of closure means may be used depending upon the size and weight of the objects to be removed from the borehole.

With the trap means closed, the current is shut off the electromagnet 14 whereby the object 15 becomes demagnetized and falls to the bottom of the cage where it rests on the closure means 21.

The cable 31 and electromagnet 14 are then reeled upwards and withdrawn from the drill string. Sections of the drill string 13 are withdrawn from the well one at a time and uncoupled. The last section of drill string 13 has the cage 11 secured at its lower end and the cage in turn carries the object 15 that was removed from the well. Before the apparatus is lowered into the well again to fish for another object the closure means 21 are re-set in the inoperative or open position.

Figure 4:
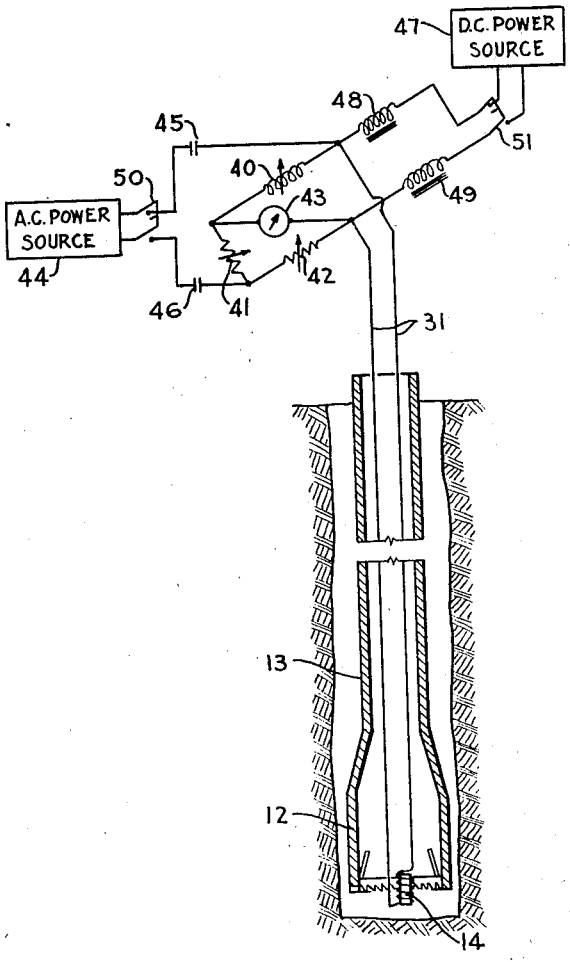
Figure 4 is a diagrammatic view, partly in cross section, of a fishing tool of the present invention that is positioned at the bottom of a well borehole and electrically connected to a power source and indicating means at the surface.

Preferably, the apparatus of the present invention incorporates suitable electrical indicating means at the well head to ascertain whether the electromagnet 14 has contacted and picked up the object 15. Since in many cases further cutting and washing of material away from the object 15 may be necessary before the electromagnet may contact it, a means for indicating progress of the fishing operation is desirable. One suitable electrical means is shown in Figure 4 wherein the electromagnet 14 at the bottom of the well borehole constitutes one arm of a bridge circuit which comprises a variable inductance 40 substantially equal in value to the electromagnet 14, variable resistance 41 and 42, an A.-C. indicating device such as an A.-C. galvanometer 43, and A.-C. power source 44, condensers 45 and 46, and a D.-C. power source 47 and choke coils 48 and 49.

When the electromagnet 14 is positioned within the non-magnetic cage 11 at the bottom of the well borehole, both A.-C. and D.-C. currents are turned on by closing switches 50 and 51. By adjustment of the variable resistances 41 and 42 the bridge is balanced to a suitable reading on A.-C. galvanometer. The isolating condensers 45 and 46 keep the D.-C. current out of the A.-C. power supply while the isolating choke coils 48 and 49 keep the A.-C. current out of the D.-C. power supply.

With the bridge balanced, the electromagnet 14 is lowered through the trap housing 16 to the bottom of the borehole where it contacts and magnetizes the object 15 to be picked up. The object 15, upon becoming attached to the pick-up plate or core of the electromagnet 14, becomes a part thereof and changes the electrical impedance of the coil of the electromagnet, said change being indicated on the A.-C. galvanometer 43 (Figure 4). It is realized that other suitable circuit means well known to the art may be used to determine the change of the electrical impedance of the electromagnet caused by the object 15 becoming attached to the electromagnet 14. When such attachment has been indicated on the A.-C. galvanometer 43, the electromagnet 14 may be raised a short distance so that the object 15 is positioned within the cage 11. The trap means, carried at the bottom of the cage, are then actuated and closed by one of the previously-described methods.

We claim as our invention:

1. For use in well installations comprising a plurality of tubular members consecutively connectable to each other to form a tubular string, a magnetic fishing device comprising in combination, non-magnetic cylindrical cage means having an axial bore therethrough, said cage means being connected to the lowermost tubular member, closure means carried by said cage means within said bore near to lower end thereof, holding means carried by said cage means normally locking said closure means in an open position, said holding means being operable by string manipulation to release said closure means, and electromagnet means adapted to be lowered inside said cage means on a conductor cable through said tubular string after said string had been formed of said tubular members to extend from the surface to the bottom of the well.

2. For use in well installations comprising a plurality of tubular members consecutively connectable to each other to form a tubular string, a magnetic fishing device comprising in combination, non-magnetic cylindrical cage means having a bore therethrough, said cage means being connected to the lowermost tubular member, non-magnetic closure means carried by said cage means near the lower end thereof, said closure means comprising a ring mounted inside said cage means and a plurality of finger-like elements hinged to the ring, said elements being movable from an open position substantially parallel to the wall of the cage to a substantially horizontal position to close the lower end of the cage, non-magnetic holding means carried by said cage means normally locking said closure means in an open position, said holding means being operable by string manipulation to release said closure means, and electromagnet means adapted to be lowered inside said cage means on a conductor cable through said tubular string after said string has been formed of said tubular members to extend from the surface to the bottom of the well.

3. For use in well installations comprising a plurality of tubular members consecutively connectable to each other to form a tubular string, a magnetic fishing device comprising in combination, non-magnetic cylindrical cage means having a bore therethrough and longitudinal slots through the wall of said cage means near the lower end thereof, said cage means being connected to the lowermost tubular member, non-magnetic closure means carried by said cage means near the lower end thereof, said closure means comprising a ring mounted inside said cage means and a plurality of segment-shaped elements hinged to the ring, said elements being movable from an open position substantially parallel to the wall of the cage to a substantially horizontal position whereby the lower end of the cage is closed, non-magnetic holding means slidably mounted in and carried by said cage means, pin means having one end secured to said holding means extending outwardly through the longitudinal slots in said cage means, a shoe slidably mounted on the outside of said cage means extending below the lower end thereof, said shoe being affixed near its upper end to the other end of said pin means, shearable pin means through the shoe and the wall of said cage means normally positioning said shoe and said holding means attached thereto whereby said holding means normally locks said segment-shaped elements of the closure means in an open position, said holding means being operable by string manipulation to release said closure means, and electromagnet means adapted to be lowered inside said cage means on a conductor cable through said tubular string after said string had been formed of said tubular members to extend from the surface to the bottom of the well.

4. For use in well installations comprising a plurality of tubular members consecutively connectable to each other to form a tubular string, a magnetic fishing device comprising in combination, non-magnetic cylindrical cage means having a bore therethrough and longitudinal slots through the wall of said cage means near the lower end thereof, said cage means being connected to the lowermost tubular member, non-magnetic closure means carried by said cage means near the lower end thereof, said closure means comprising a ring mounted inside said cage means and a plurality of segment-shaped finger-like elements hinged to the ring, said elements being movable from an open position substantially parallel to the wall of the cage to a substantially horizontal position whereby the lower end of the cage is closed, non-magnetic holding means slidably mounted in and carried by said cage means, pin means having one end secured to said holding means extending outwardly through the longitudinal slots in said cage means, a shoe slidably mounted on the outside of said cage means extending below the lower end thereof, said shoe being affixed near its upper end to the other end of said pin means, shearable pin means through the shoe and the wall of said cage means normally positioning said shoe and said holding means attached thereto whereby said holding means normally locks said segment-shaped elements of the closure means in an open position, said shearable pin means being sheared by a further lowering of said tubular string whereby said cage means and closure means are lowered with relation to said holding means and shoe means to release said closure means, and electromagnet means adapted to be lowered inside said cage means on a conductor cable through said tubular string after said string had been formed of said tubular members to extend from the surface to the bottom of the well.

5. For use in well installation comprising a plurality of tubular members consecutively connectable to each other to form a tubular string, a magnetic fishing device comprising in combination, non-magnetic cylindrical cage means having a bore therethrough, said cage means being connected to the lowermost tubular member, non-magnetic closure means carried by said cage means near the lower end thereof, said closure means comprising a ring mounted inside said cage means and a plurality of finger-like elements hinged to the ring, said elements being movable from an open position substantially parallel to the wall of the cage to a substantially horizontal position whereby the lower end of the cage is closed, holding means carried by said cage means normally locking said closure means in an open position, electromagnet means adapted to be lowered through said cage means and open closure means on a conductor cable through said tubular string after said string had been formed of said tubular members to extend from the surface to the bottom of the well, and a power source for selectively energizing said electromagnet means, said holding means being operable by manipulation of the energized electromagnet to release said closure means.

6. For use in well installations comprising a plurality of tubular members consecutively connectable to each other to form a tubular string, a magnetic fishing device comprising in combination, non-magnetic cylindrical cage means having a bore therethrough, said cage means being connected to the lowermost tubular member, a shoe mounted in screw threaded attachment on the outside of said cage means and extending below the lower end thereof, non-magnetic closure means carried by said cage means within said bore near the lower end thereof, said closure means comprising a ring mounted inside said cage means and a plurality of finger-like elements hinged to the ring, said elements being movable from an open position substantially parallel to the wall of the cage to a substantially horizontal position whereby the lower end of the cage is closed, carried by said cage means normally locking said closure means in an open position, electromagnet means adapted to be lowered through said cage means on a conductor cable through said tubular string after said string had been formed of said tubular members to extend from the surface to the bottom of the well, a power source for selectively energizing said electromagnet means, and electrical indicating means adjacent to the top of the tubular string to indicate contact between said energized electromagnet means and a magnetizable object at the bottom of the well, said holding means being operable by raising of the energized electromagnet means into said cage means whereby said closure means are released.

JAMES P. MURPHY.
HOWARD E. McKINNEY.

No references cited.